US012796746B2

(12) United States Patent
Kim

(10) Patent No.: US 12,796,746 B2
(45) Date of Patent: Nov. 17, 2026

(54) ARCH SUPPORT SOCKS AND METHOD OF MANUFACTURING THE SAME

(71) Applicant: SH APPAREL CO., LTD., Seoul (KR)

(72) Inventor: Ju Yeong Kim, Seoul (KR)

(73) Assignee: SH APPAREL CO., LTD., Seoul (KR)

( * ) Notice: Subject to any disclaimer, the term of this patent is extended or adjusted under 35 U.S.C. 154(b) by 78 days.

(21) Appl. No.: 18/930,533

(22) Filed: Oct. 29, 2024

(65) Prior Publication Data

US 2026/0107987 A1 Apr. 23, 2026

(30) Foreign Application Priority Data

Oct. 17, 2024 (KR) ........................ 10-2024-0142407

(51) Int. Cl.

| | |
|---|---|
| ***A41B 11/00*** | (2006.01) |
| ***B29B 13/10*** | (2006.01) |
| ***B29C 39/00*** | (2006.01) |
| ***B29C 39/02*** | (2006.01) |
| ***B29C 39/38*** | (2006.01) |

(Continued)

(52) U.S. Cl.

CPC ............ *A41B 11/008* (2013.01); *B29B 13/10* (2013.01); *B29C 39/003* (2013.01); *B29C 39/02* (2013.01); *B29C 39/38* (2013.01); *B29D 99/0064* (2013.01); *B29B 2013/002* (2013.01); *B29B 2013/005* (2013.01); *B29K 2027/06* (2013.01); *B29K 2067/00* (2013.01); *B29K 2105/0044* (2013.01); *B29L 2031/4842* (2013.01)

(58) Field of Classification Search

CPC .... B29L 2031/4842; B29K 2105/0044; B29K 2067/00; B29K 2027/06; B29B 2013/005; B29B 2013/002; B29B 13/10; B29D 99/0064; B29C 39/38; B29C 39/02; B29C 39/003; A41B 11/008

See application file for complete search history.

(56) References Cited

U.S. PATENT DOCUMENTS

2013/0152275 A1 6/2013 Crosby

FOREIGN PATENT DOCUMENTS

| | | |
|---|---|---|
| JP | 2002-242002 A | 8/2002 |
| JP | 2012-102441 A | 5/2012 |

(Continued)

OTHER PUBLICATIONS

Machine translation of JP 2002242002A (Year: 2002).*

(Continued)

*Primary Examiner* — Vishal I Patel

(74) *Attorney, Agent, or Firm* — Studebaker Brackett PLLC

(57) ABSTRACT

A method of manufacturing arch support socks according to one embodiment of the present invention may include an operation (a) of preparing a resin solution by mixing polyvinyl chloride (PVC) powder and dioctyl terephthalate (DOTP) liquid resin, an operation (b) of adding a heat stabilizer to the resin solution and stirring the resin solution, an operation (c) of removing impurities of the resin solution through sieving, a de-foaming operation (d) of removing bubbles in the resin solution in a vacuum state, an operation (e) of filling the de-foamed resin solution in a molding mold, an operation (f) of heating the molding mold, and an operation (g) of adhering an anti-slip part separated from the molding mold to an arch area of a sock bottom.

5 Claims, 4 Drawing Sheets

(51) Int. Cl.

| | |
|---|---|
| ***B29D 99/00*** | (2010.01) |
| *B29B 13/00* | (2006.01) |
| *B29K 27/06* | (2006.01) |
| *B29K 67/00* | (2006.01) |
| *B29K 105/00* | (2006.01) |
| *B29L 31/48* | (2006.01) |

(56) References Cited

FOREIGN PATENT DOCUMENTS

| | | | |
|---|---|---|---|
| KR | 10-2011-0008842 | A | 1/2011 |
| KR | 10-2013-0048935 | A | 5/2013 |
| KR | 10-2016-0021614 | A | 2/2016 |
| KR | 10-2018-0011573 | A | 2/2018 |
| WO | 2019/038886 | A1 | 2/2019 |

OTHER PUBLICATIONS

Machine translation of KR20120102 (Year: 2012).*
Machine translation of KR20161007 (Year: 2016).*
Machine translation of JP 2018062729 A (Year: 2018).*
Office Action issued in KR 10-2024-0142407; mailed by the Korean Intellectual Property Office on Jan. 30, 2025.
A Notice of Allowance mailed by the Korean Ministry of Intellectual Property on Dec. 2, 2025, which corresponds to Korean Patent Application No. 10-2024-0142407 and is related to U.S. Appl. No. 18/930,533.

* cited by examiner

ARCH SUPPORT SOCKS AND METHOD OF MANUFACTURING THE SAME

CROSS-REFERENCE TO RELATED APPLICATION

This application claims priority to and the benefit of Korean Patent Application No. 10-2024-0142407, filed on Oct. 17, 2024, the disclosure of which is incorporated herein by reference in its entirety.

BACKGROUND

1. Field of the Invention

The present invention relates to arch support socks and a method of manufacturing the same.

2. Discussion of Related Art

Sports socks may be developed to be woven with a material such as cotton to have functions such as heat retention, ventilation, sweat absorption, and shock absorption.

In particular, in racing sports such as marathons and running or sports such as tennis, basketball, soccer, and golf that require agility, slipping (slippage) between the foot and the sock, and slipping (slippage) between the sock and the shoe during safe and quick changes of direction, stops, starts, or the like can hinder the maximization of the exercise effect and adversely affect the athlete's safety.

To compensate for the slippage phenomenon of sports socks, sports socks have been developed to include a cushioning member for preserving a depressed area of the sole at a central area of a bottom surface of the sock, and a cushioning part that is deformed due to the weight transferred to the depressed area of the sole to bring the sole into close contact with the shoe.

The cushioning part of the sports socks can function to completely block the slippage phenomenon by bringing the sole into close contact with the shoe, but a problem of sweating on the sole may occur due to poor breathability.

Moreover, the sports socks may have structural problems such as a decrease in the cushioning function due to sweat not being discharged quickly.

Therefore, the inventor of the present invention has completed the present invention through long-term research and trial and error to develop a method of manufacturing arch support socks and socks thereof, which are capable of completely blocking slipping between the sole and the shoe by having an anti-slip part on an arch area of the sock corresponding to an arch area of the sole and quickly absorbing and quickly drying generated sweat by the anti-slip part to bring the sole into close contact with the shoe by the anti-slip part.

SUMMARY OF THE INVENTION

One embodiment of the present invention is directed to providing arch support socks and a method of manufacturing the same, which are capable of having an anti-slip part on an arch area of the sock corresponding to an arch area of the sole so that the anti-slip part supports the arch of the sole, thereby relieving a shock with the ground and implementing the balance while distributing a user's weight, and reducing the fatigue of the sole accordingly, and at the same time, quickly absorbing and quickly drying generated sweat by the anti-slip part to bring the sole into close contact with the shoe by the anti-slip part, thereby completely blocking slippage of the sole and the shoe.

Meanwhile, other objects of the present invention that are not described may be additionally considered within the range that is easily inferable from the following detailed descriptions and the effects thereof.

According to an embodiment of the present invention, a method of manufacturing arch support socks includes an operation (a) of preparing a resin solution by mixing polyvinyl chloride (PVC) powder and dioctyl terephthalate (DOTP) liquid resin, an operation (b) of adding a heat stabilizer to the resin solution and stirring the resin solution, an operation (c) of removing impurities of the resin solution through sieving, a de-foaming operation (d) of removing bubbles in the resin solution in a vacuum state, an operation (e) of filling the de-foamed resin solution in a molding mold, an operation (f) of heating the molding mold, and an operation (g) of adhering an anti-slip part separated from the molding mold to an arch area of a sock bottom.

The operation (a) may include preparing the resin solution by forming the PVC powder and the DOTP liquid resin at a weight ratio of 1:1.5 to 1.9.

The operation (b) may include adding the heat stabilizer in $1.6\times10^{-3}$ to $2.4\times10^{-3}$ parts by weight with respect to 100 parts by weight of the resin solution and stirring the resin solution for 10 to 15 minutes.

The operation (e) may include injecting the resin solution so that a filling height of the de-foamed resin solution matches a height of a honeycomb cavity.

The operation (f) may include heating the molding mold for 60 to 80 seconds in an oven.

The operation (g) may include pressing and thermally adhering the anti-slip part separated from the molding mold to the arch area of the sock bottom at a pressure of 4 $kgf/cm^2$ in an atmosphere at a temperature of 50 to 70° C. for 30 seconds.

The operation (g) may include separating the separated anti-slip part from the molding mold, then processing a ventilation hole in a honeycomb unit of the anti-slip part, and then adhering the anti-slip part to the arch area of the sock bottom.

Arch support socks manufactured by the method of manufacturing arch support socks may have a ventilation hole provided in a honeycomb unit of the anti-slip part.

Figure 1:
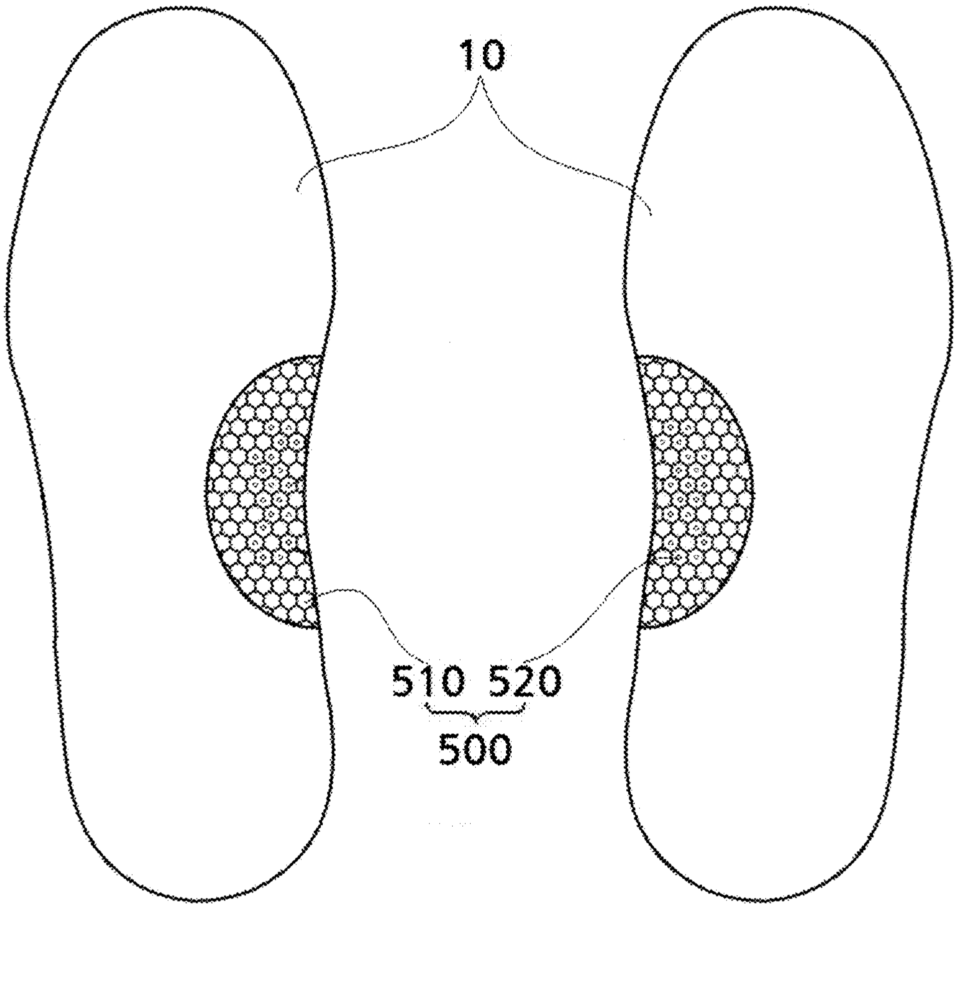
FIG. 1 is an exemplary configuration diagram showing arch support socks according to an embodiment of the present invention.

It is noted that the accompanying drawings are provided for reference to help understand the technical spirit of the present invention, and the scope of the present invention is not limited thereby.

DETAILED DESCRIPTION OF EXEMPLARY EMBODIMENTS

In describing the present invention, when it is determined that related known functions may unnecessarily obscure the gist of the present invention as items apparent to those skilled in the art, detailed descriptions thereof will be omitted.

The terms used in the present application are only used to describe specific embodiments and are not intended to limit the present invention. The singular includes the plural unless the context clearly dictates otherwise. In the application, it should be understood that the terms "include" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Since the size and thickness of each component shown in the drawings are arbitrarily shown for convenience of description, the present invention is not necessarily limited to the shown ones. In the drawings, a first direction may be defined as a longitudinal direction or an extension direction of a roadway, a second direction may be defined as a width direction, and a third direction may be defined as a height direction.

Hereinafter, a method of manufacturing arch support socks and socks thereof according to the present invention will be described in detail with reference to the accompanying drawings, and in describing the present invention with reference to the accompanying drawings, the same or corresponding components are denoted by the same reference numerals, and overlapping descriptions thereof will be omitted.

FIG. 1 is an exemplary configuration diagram showing arch support socks according to an embodiment of the present invention.

As shown in FIG. 1, the arch support socks according to the embodiment of the present invention may be formed with an anti-slip part 500 adhered to an arch area of a sock bottom 10.

The arch support socks according to the embodiment of the present invention may function to increase the adhesion of the sole to the ground during exercise such as running and block a slip phenomenon caused by low adhesion in an arch area of the sole due to the movement of weight.

Furthermore, in the arch support socks according to the embodiment of the present invention, the anti-slip part 500 adhered to the arch area of the sock bottom 10 may function to bring the arch area of the sock bottom 10 into close contact with the shoe to fundamentally block the slip phenomenon between the sole and the shoe.

In particular, the anti-slip part 500 adhered to the arch area of the sock bottom 10 in the arch support socks according to the embodiment of the present invention may be formed of a honeycomb or honey paper that has a hexagonal structure, such as a structure of the honeycomb unit 510.

In this case, the honeycomb unit 510 has a structure of the honeycomb or honey paper, is very stable and may fill a flat surface without gaps, and therefore may use a space very efficiently with the minimum material, and implement excellent durability against a compressive force that presses in a vertical direction or from the top to the bottom.

In addition, the honeycomb unit 510 of the anti-slip part 500 may have ventilation holes 520 provided at the center thereof, and the honeycomb unit 510 may be formed to entirely or partially have the ventilation holes.

Figure 2:
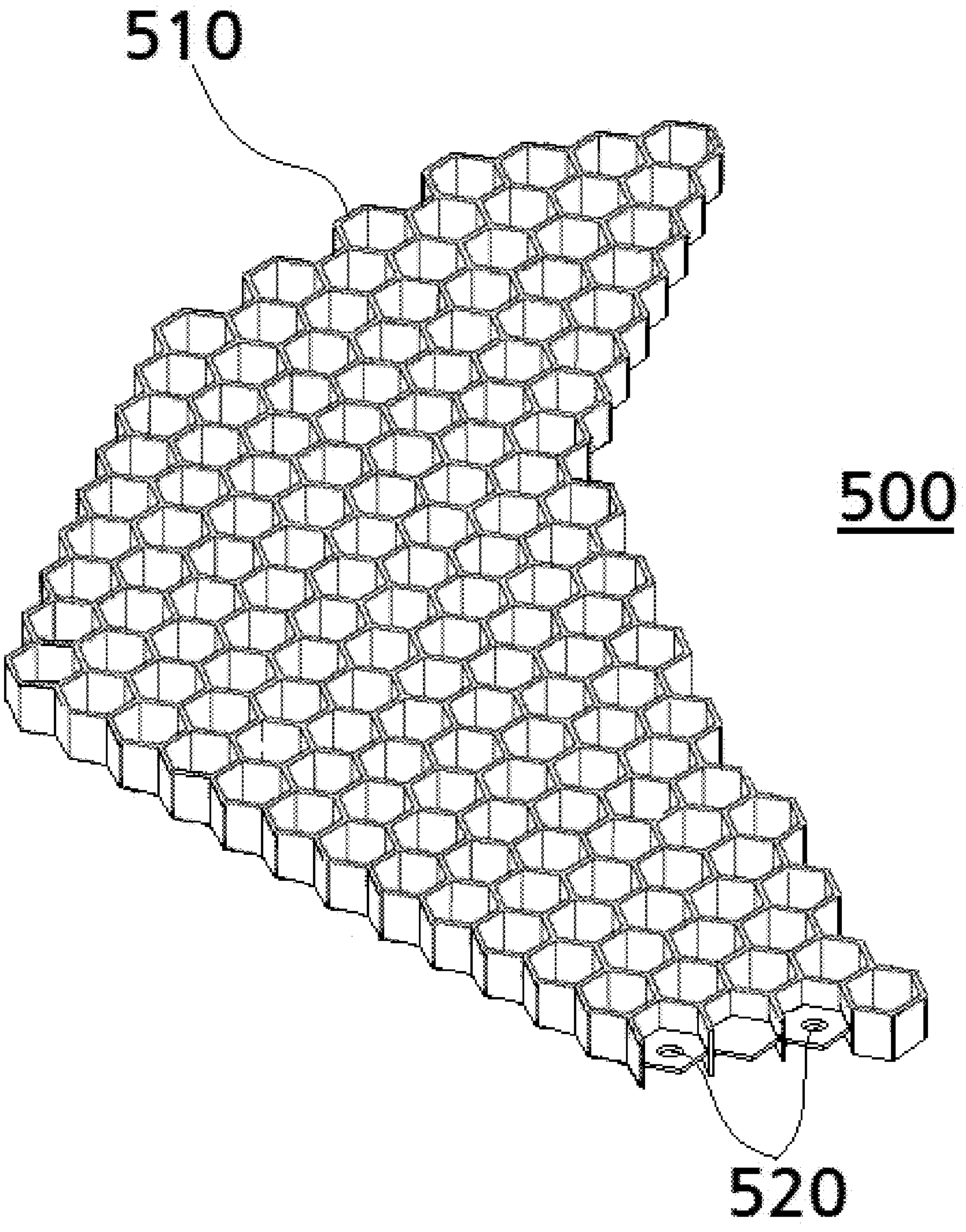
FIG. 2 is an exemplary configuration diagram showing an anti-slip part of the arch support socks according to the embodiment of the present invention.

FIG. 2 is an exemplary configuration diagram showing an anti-slip part of the arch support socks according to the embodiment of the present invention.

As shown in FIG. 2, the anti-slip part 500 of the arch support socks according to the embodiment of the present invention may have an arched sole and may be provided to be adhered to the arch area of the sock bottom 10 and to come into close contact with an inner bottom surface of the shoe.

In this case, the anti-slip part 500 of the arch support socks according to the embodiment of the present invention may be formed of the honeycomb unit 510, and the honeycomb unit 510 may have a hexagonal structure and may be made of an elastic material to have elasticity.

Here, the anti-slip part 500 may function so that the honeycomb unit 510 is pressed by receiving the compressive force due to weight transferred from the arch area of the sole.

In particular, each honeycomb unit 510 of the sock bottom 10 has an upper surface having a different shrinkage depth along the arch shape of the sole, but each lower surface thereof comes into close contact with the inner bottom surface of the shoe regardless of the arch shape of the sole having different sizes and depths depending on a person to provide a number of unspecified sock wearers with the same adhesion.

Furthermore, the anti-slip part 500 may function to block the slim phenomenon of the sole and the shoe by perfectly bringing each honeycomb unit 510 into close contact with the arch area of the sole, and at the same time, bringing each honeycomb unit 510 into close contact with the inner bottom surface of the shoe, thereby preventing the shaking of the lower body of the sock wearer and inducing the balance of the upper body and lower body to prevent injury.

Ultimately, the arch support socks according to the embodiment of the present invention may be formed so that the entire sole comes into close contact with the inner bottom surface of the shoe by transferring the weight transferred from the arch of the sole to the inner bottom surface of the shoe by the anti-slip part 500 provided on the arch area of the sock bottom 10, thereby minimizing the instability due to the imbalance of the weight and securing stronger adhesion with the ground to implement stable exercise.

In addition, the arch support socks according to the embodiment of the present invention may naturally discharge sweat generated from the sole during exercise, and the sweat discharged from the socks may be discharged to the shoe through the anti-slip part 500.

In this case, the arch support socks according to the embodiment of the present invention may have ventilation holes 520 formed in each honeycomb unit 510 to smoothly discharge the sweat.

Here, the arch support socks according to the embodiment of the present invention may be formed to secure the breathability of the anti-slip part 500 through the ventilation holes 520.

Therefore, the arch support socks according to the embodiment of the present invention may function to quickly absorb sweat generated from the sole through the ventilation holes 520 of each honeycomb unit 510 of the anti-slip part 500, and at the same time, discharge the sweat to the inner bottom of the shoe for quick drying.

Figure 3:
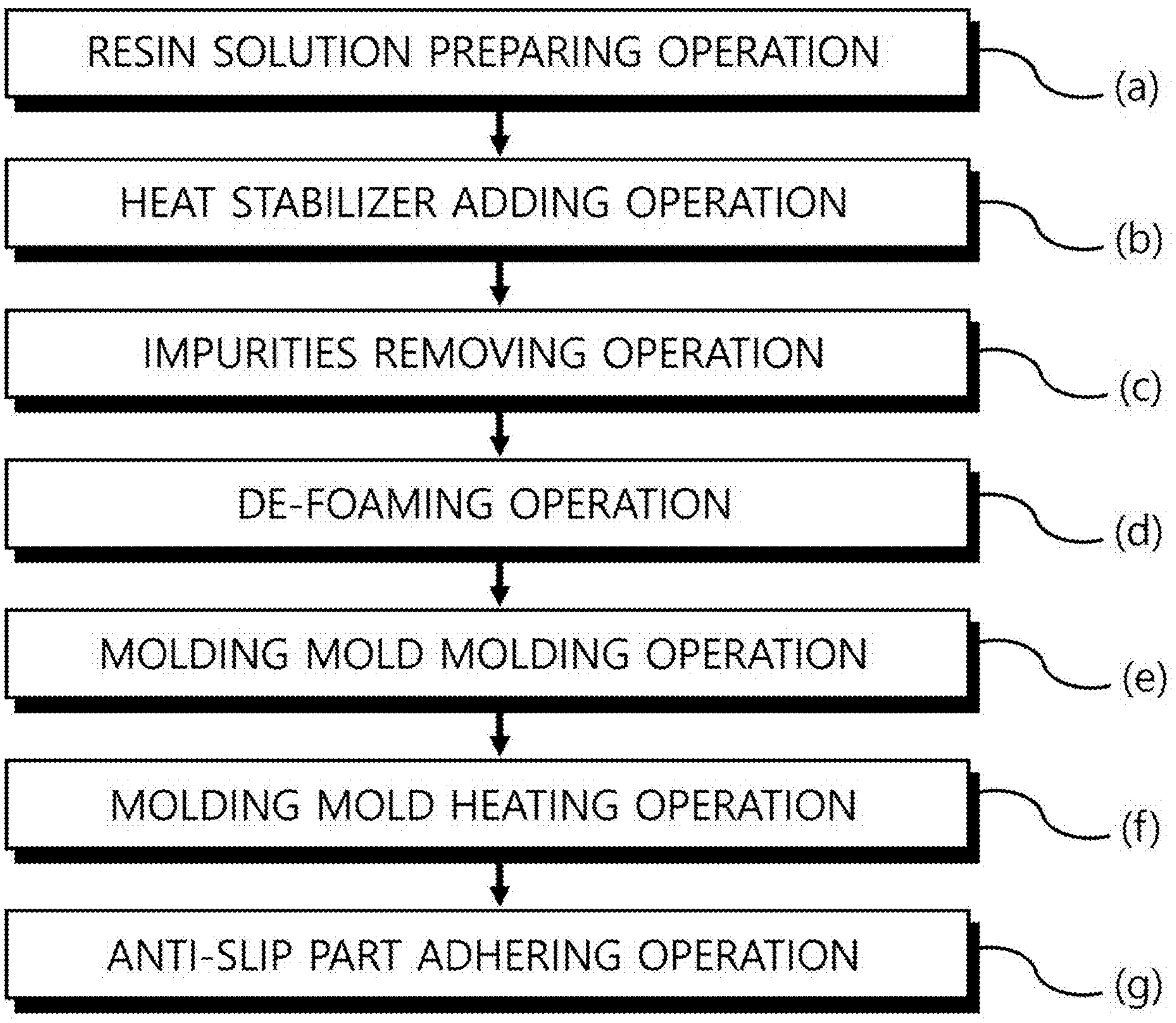
FIG. 3 is a flowchart for describing a method of manufacturing arch support socks according to an embodiment of the present invention.

FIG. 3 is a flowchart for describing a method of manufacturing arch support socks according to an embodiment of the present invention.

As shown in FIG. 3, a method of manufacturing arch support socks according to the embodiment of the present invention may include an operation (a) of preparing a resin solution by mixing polyvinyl chloride (PVC) powder and dioctyl terephthalate (DOTP) liquid resin at a constant mixing ratio, an operation (b) of adding a heat stabilizer to the resin solution and stirring the resin solution, an operation (c) of removing impurities from the resin solution through sieving, an de-foaming operation (d) of discharging air bubbles of the resin solution mixed in a vacuum state, an operation (e) of filling a molding mold with a de-foamed resin solution, an operation (f) of heating the molding mold filled with the de-foamed resin solution, and an operation (g) of adhering an anti-slip part separated from the molding mold to an arch area of a sock bottom.

First, in the method of manufacturing arch support socks according to the embodiment of the present invention, the operation (a) of preparing the resin solution by mixing the PVC powder and the DOTP liquid resin at the constant mixing ratio may include mixing the PVC powder and the DOTP liquid resin at a weight ratio of 1:1.5 to 1.9.

In this case, PVC is a polymer material made using vinyl chloride and may be prepared by additionally polymerizing a vinyl chloride monomer produced by reacting ethylene and chlorine obtained from petroleum.

In addition, PVC may become soft vinyl chloride when a plasticizer is added to hard vinyl chloride, which is a colorless, transparent, and hard material.

Table 1 below shows the physical properties of the PVC.

TABLE 1

| Physical property | Hard | Soft |
|---|---|---|
| Specific gravity | 1.30 to 1.58 | 1.16 to 1.35 |
| Tensile strength (MPa) | 41 to 52 | 11 to 25 |
| Tensile modulus (MPa) | 2400 to 4100 | — |
| Compressive strength (MPa) | 55 to 89 | 6 to 12 |
| Bending strength (MPa) | 69 to 110 | — |

In particular, PVC may be an excellent flame retardant material that has a flashing temperature of 391° C. and an ignition temperature of 455° C. and does not ignite or burn as easily as paper, wood, or polyethylene.

In addition, PVC does not easily undergo an oxidation reaction with oxygen in the air, has excellent durability, exhibits high chemical resistance to most inorganic chemicals including acids and alkali, has an arc resistance ranging from 60 to 800 seconds, has excellent electrical insulation, and has excellent processability such as calendar molding, thermoforming, dipping processing, injection molding, and cutting processing.

In addition, DOTP is a colorless liquid resin with a molecular formula of $C_{24}H_{38}O_4$ and is a plasticizer that is used in various ways.

DOTP is also known as bis(2-ethylhexyl) terephthalate and may be derived from terephthalic acid and 2-ethylhexanol.

DOTP as a plasticizer for preparing a polymer can improve the flexibility, extensibility, and toughness of PVC to function to be suitable for various final purposes and can be commonly used in producing PVC products such as cables, flooring, vehicle parts, and medical devices.

DOTP may be added to adhesives and sealants to increase bonding strength and flexibility, may improve bonding strength to any substrate and improve the overall performance of the preparation of adhesives.

In particular, DOTP is an environmentally friendly, odorless, liquid resin with non-toxic properties and biodegradability, and thus may be suitable for use in preparing an adhesive for skin contact.

Meanwhile, in the method of manufacturing arch support socks according to the embodiment of the present invention, a resin solution may be prepared by mixing the PVC powder and the DOTP liquid resin at a weight ratio of 1:1.5 to 1.9.

Here, when the weight ratio of the DOTP liquid resin to the PVC powder is smaller than 1.5, the flexibility of the PVC resin may be insufficient, resulting in poor adhesion to the shoe, and when the above weight ratio exceeds 1.9, environmental pollution may occur, such as the emission of hazardous substances during manufacturing processes that are performed at high temperatures, such as mixing and melting processes.

In addition, in the method of manufacturing arch support socks according to the embodiment of the present invention, the operation (b) of adding the heat stabilizer to the resin solution and stirring the resin solution may include adding the heat stabilizer to the resin solution in which the PVC powder and the DOTP liquid resin are mixed and forming the resin solution so that the physical and chemical properties of the resin solution are maintained.

In this case, the heat stabilizer is a compound that is added so that the physical and chemical properties of the formed resin are maintained while mixing various resins to complete the product through the processing process.

Since a series of processes for mixing and manufacturing plastics are performed at high temperatures, the resin may rapidly decompose due to heat and oxygen.

In particular, PVC used as a general-purpose plastic in various applications due to a low price and excellent processability has a disadvantage of being weak to heat, and thus a heat stabilizer may be used to compensate for this.

In this case, the heat stabilizers may be classified into powder, liquid, paste, and granule stabilizers according to forms and classified into Cd/Ba/Zn, Cd/Ba, Ba/Zn, Ca/Zn, Na/Za, Sn, Pb, Cd, and Zn according to properties.

In addition, the heat stabilizers may be classified into soft (for calendering or extrusion molding) and hard (for calendering or extrusion molding) according to applications, and for calendering, classified into foaming, sheet, leather processing, SOL processing (for sheets, leather, or foaming), and heat-resistant.

The main types of heat stabilizers of PVC may include lead stabilizers, metallostone stabilizers such as Ba—Cd, Ca—Zn, Ba—Zn, and organotin stabilizers.

In addition, organic stabilizers, which have little effect when used alone but exhibit a synergistic effect in terms of heat stability when used in conjunction with the main heat stabilizers, may be used as an auxiliary stabilizer.

The lead stabilizer has excellent electrical insulation, weather resistance, and long-term heat stability, and though it has disadvantages such as toxicity, opacity, and sulfur contamination, it is relatively inexpensive, and therefore may be used for a wide range of applications such as wire coverings, rigid pipes or profiles, PVC tiles, and PVC fittings.

The Ba—Cd stabilizer has the excellent heat stability effect and transparency, but has a problem with the heavy metal cadmium, and the Ba—Zn stabilizer has relatively good heat stability and transparency, and therefore is used for all soft PVC products. In particular, since the Ba—Zn stabilizer is suitable for processing a paste resin and has lower toxicity than the Ba—Cd stabilizer, it is being used more and more often in place of the Ba—Cd stabilizer.

The Ca—Zn stabilizer as a non-toxic stabilizer is widely used in food packaging materials, toys, food containers, medical devices, and the like, but is used in conjunction with an auxiliary stabilizer due to the inferior heat stability effect to other stabilizers and is mainly in the form of a powder, but tends to liquefy.

The organotin stabilizer has excellent transparency and heat stability, but may have disadvantages of lack of external activity, sulfur contamination by cadmium or lead, and a strong odor characteristic of sulfur compounds.

Representative inorganic and metallolith stabilizers include tribasic lead sulfate (TLS), DBL, and dibasic lead phosphite (DLP), and DLP and Pb-St are widely used in window products.

In a method of manufacturing sports socks according to an embodiment of the present invention, $1.6\times10^{-3}$ to $2.4\times10^{-3}$ parts by weight of a heat stabilizer may be included with respect to 100 parts by weight of a resin solution formed of the PVC powder and the DOTP liquid resin.

In this case, when the heat stabilizer is added in less than $1.6\times10^{-3}$ parts by weight with respect to 100 parts by weight of the resin solution formed of the PVC powder and the DOTP liquid resin, the toxic gas generated in the manufacturing process may be discharged without being completely removed, thereby causing a risk and causing the pyrolysis of the PVC resin.

When the heat stabilizer is added in an amount of more than $2.4\times10^{-3}$ parts by weight with respect to 100 parts by weight of the resin solution formed of PVC powder and DOTP liquid resin, there may be a problem that the heat stabilizer may not be completely mixed with the resin solution and some of the heat stabilizer may precipitate and burn in a melting process.

In particular, in the method of manufacturing the sports socks according to the embodiment of the present invention, the operation (b) of adding the heat stabilizer to the resin solution and stirring the resin solution may include adding the heat stabilizer to the resin solution mixed with the PVC powder and the DOTP liquid resin and then sufficiently stirring the resin solution for 10 to 15 minutes.

In the method of manufacturing the sports socks according to the embodiment of the present invention, the operation (c) of removing the impurities in the resin solution through sieving may include removing impurities in the resin solution by adding the heat stabilizer to the resin solution formed of the PVC powder and the DOTP liquid resin and then passing the resin solution through a sieve strainer in the mixing process in a mixer.

In the method of manufacturing the sports socks according to the embodiment of the present invention, the de-foaming operation (d) of discharging bubbles in the resin solution mixed in a vacuum state may include a de-foaming process of putting the resin solution in a vacuum chamber of a de-foamer and removing bubbles in the solution through dispersion and stirring by a blade.

Fluids such as paint, an epoxy resin, grease, a coating solution, or a sealant may be subjected to the de-foaming process to remove bubbles included therein.

For example, high viscosity fluids prepared by mixing materials of different components such as coating solutions or sealants need to be stirred so that each component is evenly dispersed, and bubbles may be mixed in the stirring process.

Since the resin solution including bubbles may cause defects in the final product, the de-foaming process for removing bubbles should be performed.

The de-foamer may function to perform de-foaming by suctioning air from the bubbles in the resin solution in a vacuum device in the process of stirring the resin solution using the blade of the vacuum chamber.

In particular, in the method of manufacturing arch support socks according to the embodiment of the present invention, in the de-foaming operation (d) of discharging the bubbles of the resin solution mixed in the vacuum state, the de-foaming process may be performed for 10 to 15 minutes, but in an atmosphere in which a large amount of moisture is present, the de-foaming process may be performed for up to 30 minutes.

In addition, in the method of manufacturing arch support socks according to the embodiment of the present invention, the operation (e) of filling the molding mold with the de-foamed resin solution may include filling a cavity of the molding mold with the de-foamed resin solution through an injector.

Figure 4:
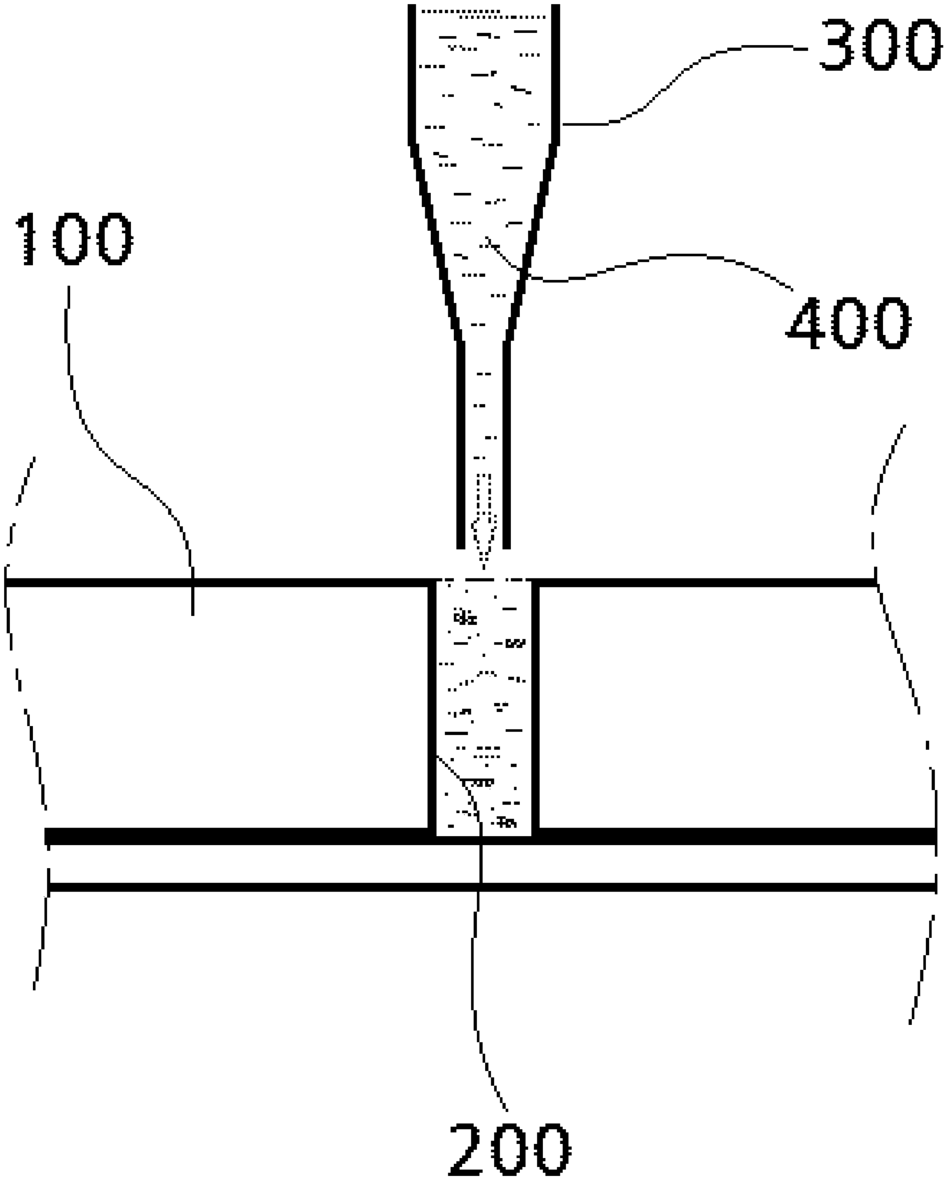
FIG. 4 is a cross-sectional schematic view for describing an operation (e) of filling a molding mold with a de-foamed resin solution in the method of manufacturing arch support socks according to the embodiment of the present invention.

FIG. 4 is a cross-sectional schematic view for describing an operation (e) of filling a molding mold with a de-foamed resin solution in the method of manufacturing arch support socks according to the embodiment of the present invention.

As shown in FIG. 4, the method of manufacturing arch support socks according to the embodiment of the present invention may include putting a de-foamed resin solution 400 in an injector 300 and injecting the de-foamed resin solution 400 into a honeycomb cavity 200 of a molding mold 100 in the operation (e).

In this case, the de-foamed resin solution 400 discharged from the injector 300 may be injected into the honeycomb cavity 200 of the molding mold 100 and controlled to completely 100% fill the honeycomb cavity 200.

That is, the de-foamed resin solution 400 may be injected so that a filling height matches a height of the honeycomb cavity 200 of the molding mold 100, and each honeycomb unit 510 of the anti-slip part 500 manufactured molded accordingly may have the same height and implement the same compressive stress and elastic force.

In addition, in the method of manufacturing arch support socks according to the embodiment of the present invention, the operation (f) of heating the molding mold filled with the de-foamed resin solution may include heating the molding mold 100 that 100% fills the honeycomb cavity 200 using a heating part such as an oven.

In this case, when the molding mold 100 in which the de-foamed resin solution 400 that 100% fills the honeycomb cavity 200 is heated for less than 60 seconds, the anti-slip part 500 molded in the honeycomb cavity 200 of the molding mold may be broken.

In addition, when the molding mold 100 in which the de-foamed resin solution 400 100% fills the honeycomb cavity 200 is heated for more than 80 seconds, the anti-slip part 500 formed in the honeycomb cavity 200 of the molding mold may be burned.

In addition, after being subjected to the process of heating the molding mold 100 in which the de-foamed resin solution 400 100% fills the honeycomb cavity 200 using the heating part such as an oven, the anti-slip part 500 may be molded transparently.

In the method of manufacturing arch support socks according to the embodiment of the present invention, the operation (g) of adhering the anti-slip part separated from the molding mold to the arch area of the sock bottom may include separating the molded anti-slip part 500 from the molding mold 100 and then adhering the anti-slip part to the arch area of the sock bottom 10.

Alternatively, in the method of manufacturing arch support socks according to the embodiment of the present invention, the operation (g) of adhering the anti-slip part separated from the molding mold to the arch area of the sock bottom may including separating the molded anti-slip part 500 from the molding mold 100, then processing the ventilation holes 520 in the entirety or some of the honeycomb unit 510 of the anti-slip part 500, and then adhering the anti-slip part having the ventilation holes in the arch area of the sock bottom 10.

In this case, the sock may be put on a sock-shaped support pad, and the anti-slip part 500 may be bonded by being pressed by a press after being placed on the arch area of the sock bottom 10.

Here, the method of adhering the anti-slip part 500 to the arch area of the sock bottom 10 may use thermal compression, an adhesive, or the like.

In particular, the thermal compression may be completed by pressing the anti-slip part 500 to the arch area of the sock bottom 10 for 30 seconds at a pressure of 4 kgf/cm$^2$ in an atmosphere at a temperature of 50 to 70° C.

The thermal compression conditions can prevent the anti-slip part 500 from lifting off from the arch area of the sock bottom 10, and the color of each honeycomb unit 510 may be determined as the dyeing color of the sock bottom 10 is naturally transferred to the transparent anti-slip part 500.

The arch support socks manufactured as described above can be worn in any exercise environment and in daily life and can be suitable for wearing in sports that require moving the feet for a long time, for example, suitable for activities that require continuous and even use of the feet for a long time, such as golf, mountaineering, hiking, and walking.

However, the arch support socks according to the present invention cannot be suitable for sports that require a rapid change in direction and strong foot movement, such as soccer and tennis.

The arch support socks according to the present invention can be very suitable for workers who work standing up or work outdoors for a long time.

In particular, when workers who work at construction sites or work standing up for a long time outdoors or indoors and workers who usually get tired easily or have pain in their feet or have flat feet wear the arch support socks according to the present invention, it is possible to reduce the fatigue of the feet, relieve and prevent pain, and prevent injury.

According to one embodiment of the present invention, arch support socks and a method of manufacturing the same can provide the substantial and practical effects in which, by having an anti-slip part on a sock area corresponding to an arch area of the sole, it is possible to quickly absorb and quickly dry generated sweat by an anti-slip part, completely block the slippage of the sole and the shoe by bringing the sole into close contact with the shoe by the anti-slip part, distribute a user's weight, relieve a shock with the ground, and implement the balance of the foot by supporting the arch of the foot by the anti-slip part, reduce the fatigue of the foot accordingly, and at the same time, alleviate or prevent the pain in the sole.

Meanwhile, the effects described in the following specification and tentative effects thereof, as expected from the technical features of the present invention, even if not explicitly described herein, are handled as if they were described in the specification of the present invention.

The scope of the present invention is not limited to the description and expression of the embodiments explicitly described above. In addition, it should be understood that the scope of the present invention may not be limited due to obvious changes or substitutions in the technical field to which the present invention pertains.

What is claimed is:

1. A method of manufacturing arch support socks, comprising:

an operation (a) of preparing a resin solution by mixing polyvinyl chloride (PVC) powder and dioctyl terephthalate (DOTP) liquid resin;

an operation (b) of adding a heat stabilizer to the resin solution and stirring the resin solution;

an operation (c) of removing impurities of the resin solution through sieving;

a de-foaming operation (d) of removing bubbles in the resin solution in a vacuum state;

an operation (e) of filling the de-foamed resin solution in a molding mold having a honeycomb cavity, wherein a filling height of the de-foamed resin solution matches a height of the honeycomb cavity;

an operation (f) of heating the molding mold; and an operation (g) of adhering an anti-slip part separated from the molding mold to an arch area of a sock bottom, wherein the anti-slip part comprises a plurality of honeycomb units having the same height, wherein the operation (g) includes separating the anti-slip part from the molding mold, then processing a ventilation hole in each of the plurality of honeycomb units, and then adhering the anti-slip part to the arch area of the sock bottom, and wherein each of the plurality of honeycomb units is provided with the ventilation hole.

2. The method of claim 1, wherein the operation (a) includes preparing the resin solution by forming the PVC powder and the DOTP liquid resin at a weight ratio of 1:1.5 to 1.9.

3. The method of claim 1, wherein the operation (b) includes adding the heat stabilizer in $1.6\times10^{-3}$ to $2.4\times10^{-3}$ parts by weight with respect to 100 parts by weight of the resin solution and stirring the resin solution for 10 to 15 minutes.

4. The method of claim 1, wherein the operation (f) includes heating the molding mold for 60 to 80 seconds in an oven.

5. The method of claim 1, wherein the operation (g) includes pressing and thermally adhering the anti-slip part separated from the molding mold to the arch area of the sock bottom at a pressure of 4 kgf/cm$^2$ in an atmosphere at a temperature of 50 to 70° C. for 30 seconds.

* * * * *